United States Patent [19]
Uenishi et al.

[11] Patent Number: 5,293,444
[45] Date of Patent: Mar. 8, 1994

[54] WAVELENGTH CONVERTER

[75] Inventors: Naota Uenishi; Takafumi Uemiya, both of Osaka, Japan

[73] Assignee: Sumitomo Electric Industries, Ltd., Osaka, Japan

[21] Appl. No.: 803,998

[22] Filed: Dec. 9, 1991

[30] Foreign Application Priority Data

Dec. 14, 1990 [JP]  Japan .................................. 2-402384
Dec. 27, 1990 [JP]  Japan .................................. 2-408167
Dec. 27, 1990 [JP]  Japan .................................. 2-408168

[51] Int. Cl.⁵ .......................................... G02B 6/10
[52] U.S. Cl. ........................................ 385/122; 372/50
[58] Field of Search .......................... 372/22, 50, 23; 385/122, 123; 359/326–332

[56] References Cited

U.S. PATENT DOCUMENTS

| | | | |
|---|---|---|---|
| 4,676,594 | 6/1987 | Presby | 385/123 |
| 4,814,118 | 3/1989 | Plummer et al. | 264/2.2 |
| 4,824,220 | 4/1989 | Yamamoto et al. | 372/22 |
| 4,830,447 | 5/1989 | Kamiyama et al. | 350/96.12 |
| 4,952,013 | 8/1990 | Harada et al. | 385/123 |
| 4,981,337 | 1/1991 | Okamoto et al. | 350/96.29 |
| 5,007,694 | 4/1991 | Yamamoto et al. | 372/50 |
| 5,033,053 | 7/1991 | Shimizu et al. | 372/23 |

FOREIGN PATENT DOCUMENTS

| | | |
|---|---|---|
| 0352751 | 1/1990 | European Pat. Off. |
| 0360122 | 3/1990 | European Pat. Off. |
| 0377988 | 7/1990 | European Pat. Off. |
| 1-287531 | 11/1989 | Japan |
| 1-293325 | 11/1989 | Japan |
| 2-35423 | 2/1990 | Japan |
| 2-153328 | 6/1990 | Japan |
| 2-186327 | 7/1990 | Japan |

*Primary Examiner*—Akm E. Ullah
*Attorney, Agent, or Firm*—Cushman, Darby & Cushman

[57] ABSTRACT

An apparatus and method of manufacturing a wavelength converter of an optical fiber type, having a core and a clad covering the core. At least one of the core and clad is made of a nonlinear optical material such that copious amounts of second harmonic light are emitted form a light emitting end face of the optical fiber. Grooves and/or flanges are formed in or on the clad or a transparent layer covering the clad. The transparent layer also covers the light emitting end face of the optical fiber. A collimating surface is formed on the transparent layer at the light emitting end face for collimating the second harmonic light emitted. Various molds are used to form different collimating surfaces, grooves, and flanges in and on the transparent layer.

29 Claims, 11 Drawing Sheets

WAVELENGTH CONVERTER

BACKGROUND OF THE INVENTION

1. Field of the Invention

The present invention relates to a wavelength converter which generates from an incident laser light beam a second harmonic of the laser light beam, and is easily positioned within a light source device and/or outputs the second harmonic laser light as parallel rays.

2. Description of the Related Art

Second harmonics of laser light occur in a medium due to the nonlinear optical effect. This phenomenon causes the generation of second harmonics when the polarization of laser light incident on a medium is proportional to the second and higher degrees of the electric field of the incident laser light.

Materials in which the nonlinear optical effect occurs are called nonlinear optical materials. The inorganic materials $KH_2PO_4$ and $LiNbO_3$ are currently used nonlinear optical materials. Organic material 2-methyl-4-nitrileanilin (MNA) has attracted some attention as a nonlinear optical material because it has a superb nonlinear optical constant.

Typical wavelength converter confine the fundamental component (i.e. incident laser light) using high energy density nonlinear optical materials, wherein the interaction of the harmonic components and the fundamental components is elongated. For this reason, an optical wave guide type of wavelength converter is used. This type of wavelength converter has a narrow wave guide, within which light propagates, formed on a substrate; and the wave guide and substrate are covered with an overlayer. In order to produce copious amounts of second harmonic light, the optical wave guide must accept a phase propagating velocity of the second harmonic. In other words, the fundamental component must phase match the second harmonic component. The simplest method known for obtaining this phase match is based on Cerenkov radiation.

The Cerenkov method of phase matching follows. Shown in FIG. 1 (PRIOR ART), a second harmonic light is generated from light propagating through an optical guide portion 121 at point A. The second harmonic light propagates at and angle $\alpha$, with respect to the optical axis of the optical guide portion 121, towards a substrate 122 and an overlayer 123. After a predetermined time period, the second harmonic light is generated at point B as generated at point A. If the equiphase plane of the second harmonic light generated at point A is coincident with that of the second harmonic light generated at point B, then the second harmonic light is emitted. The emission of the second harmonic light is in the direction of angle $\alpha$. If the following relation holds:

$$n_S(2w) > n_G(w) > n_S(w), \qquad (1)$$

where,
 $n_S(w)$ is the refractive index of the substrate 122 for the fundamental component,
 $n_G(w)$ is the refractive index of the wave guide portion 121, and
 $n_S(2w)$ is the refractive index of the substrate 122 for the second harmonic component;
phase matching occurs.

In an optical wave guide type of wavelength converter as described above, the flux of light rays propagating through the wave guide is accurately shaped in cross section; however, condensation of the emitted light rays is poor. In other words, the emitted light rays cannot be condensed into a small spot. Therefore, it is difficult to utilize the second harmonic light for writing data into and reading data out of an optical recording medium, such as an optical disk.

It has been demonstrated that an optical fiber type of wavelength converter as shown in FIG. 2 can realize a high density recording in an optical disk. Wavelength converter 130 of the optical fiber type includes a core 131 and a clad 132 having refractive indices satisfying equation (1). The second harmonic light 133 emitted from the end face expands in the form of a rotational symmetric ring. Accordingly, this type of wavelength converter has an excellent condensing characteristic.

To condense the emitted light rays of a wavelength converter of the optical fiber type, it is necessary to collimate (make parallel) the emitted light rays. Japanese Patent Unexamined Publication Nos. Hei.1-287531, 1-293325, 2-35423, 2-153328, and 2-186327 disclose techniques to collimate emitted light rays.

In Japanese Patent Unexamined Publication No. Hei. 1-287531, there is disclosed a light source device in which a circular cone prism, used as a collimating lens, collimates second harmonic light emitted from a wavelength converter of the optical fiber type.

Shown in FIG. 3, is the technique disclosed in Japanese Patent Unexamined Publication No. Hei.2-153328 for collimating emitted light rays using a Fresnel lens 151. The Fresnel lens 151 incorporates a concentric circular diffraction grating directed towards the light emitting end face 150a of wavelength converter 150. Once the emitted light rays have been collimated the light rays can be easily condensed.

In both devices described above, it is difficult to position the wavelength converter within a light source device due to the small size (1 to 2 $\mu m$) of the wavelength converter. The devices also have the disadvantage that it is difficult to properly align the optical axis of the wavelength converter with the axis of rotational symmetry of the collimating lens. Furthermore, difficulty arises in the correct adjustment of the distance between the light emitting end face of the wavelength converter and the collimating lens; exact positioning is quite complicated.

The device disclosed in Japanese Patent Unexamined Publication No. Hei. 1-293325 is shown in FIG. 4. As shown, the light emitting end face of the optical fiber 141 is machined to a circular slanting surface 141a for collimating emitted second harmonic light.

This device has the drawback that the light emitting end face must be accurately machined. Often in machining, the light emitting end face is broken or scarred; thus reducing the amount of second harmonic light emitted.

SUMMARY OF THE INVENTION

The object of the present invention is to simplify the positioning, alignment and construction problems of conventional wavelength converter of the optical fiber type.

The objectives of the present invention are achieved by providing a wavelength converter of the optical fiber type and a method for its production. The optical fiber core and/or cladding is made of nonlinear optical material such that copious amounts of second harmonic light are emitted.

In a first and second embodiment, a groove or flange is formed circumferentially in or on the clad. In a third and fourth embodiment a transparent layer is formed on at least the outer surface of the clad and a groove or flange is formed circumferentially thereon. The groove and flange allow easy and quick positioning of the wavelength converter within a light source device.

In a fifth and sixth embodiments, at least the end face emitting the second harmonic light is covered with a transparent layer, and formed on the light emitting end face of the transparent layer is a collimating means for collimating the second harmonic light.

In operation, fundamental light propagates through the nonlinear fiber optic which produces second harmonic light. The emitted second harmonic light passes through the transparent layer and is collimated by the collimating means formed on the light emitting end face of the transparent layer. The collimating means eliminates the need for a separate collimating lens and eliminates any positioning and/or aligning problems involved when using a separate collimating lens.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DESCRIPTION OF THE PREFERRED EMBODIMENTS

Figure 6:
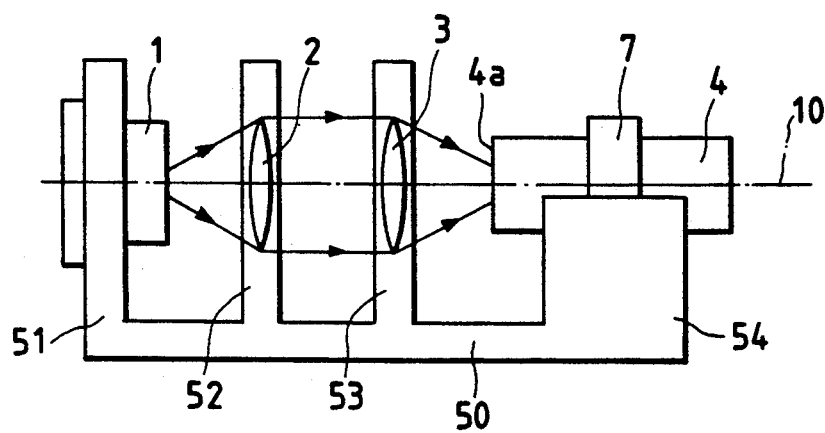
FIG. 6 is a schematic diagram showing a light source device using the wavelength converter of the first embodiment of the present invention.

FIG. 6 is a schematic diagram showing a light source device using a wavelength converter according to an embodiment of the present invention. Laser light rays emitted from a laser light source 1, such as a semiconductor laser, are collimated by a spherical lens 2. The collimated laser light rays are condensed by a spherical condenser lens 3, and incident on a wavelength converter 4. The laser light source 1, spherical lens 2, spherical lens 3, and the wavelength converter 4 are positioned at and fixed to holders 51, 52, 53, and 54 integral with a base 50 by means of an adhesive. Wavelength converter 4 being positioned orthogonal to its optical axis 10 as shown.

Figure 1:
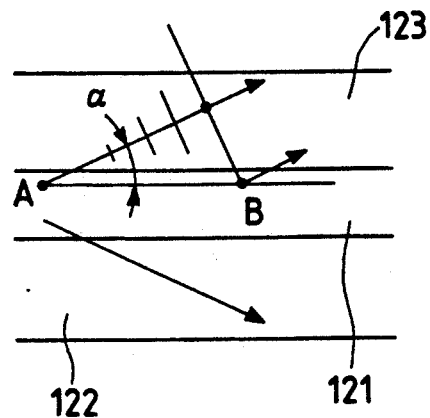
FIG. 1 is a diagram for explaining the prior art phase matching method based on Cerenkov radiation.
Figure 2:
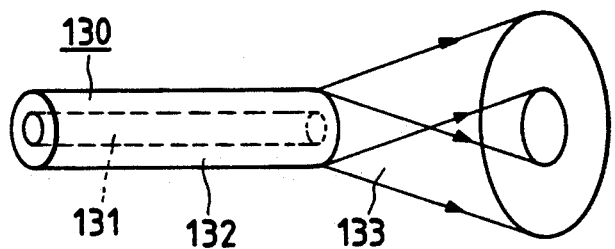
FIG. 2 is a diagram showing the shape of light rays emitted from a prior art wavelength converter of the optical fiber type.
Figure 3:
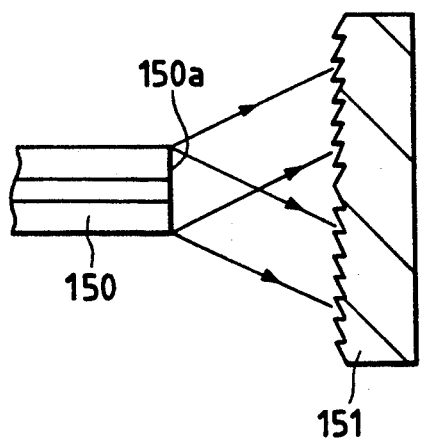
FIG. 3 is a sectional view of a prior art device for collimating light rays emitted from a wavelength converter of the optical fiber type shown in FIG. 2.
Figure 4:
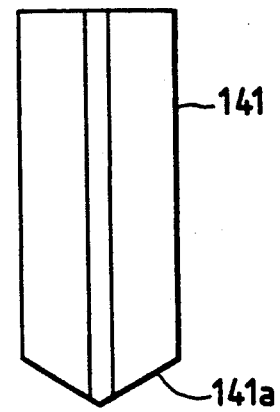
FIG. 4 is a sectional view of a prior art device of a wavelength converter of the optical fiber type which emits collimated light rays.
Figure 5:
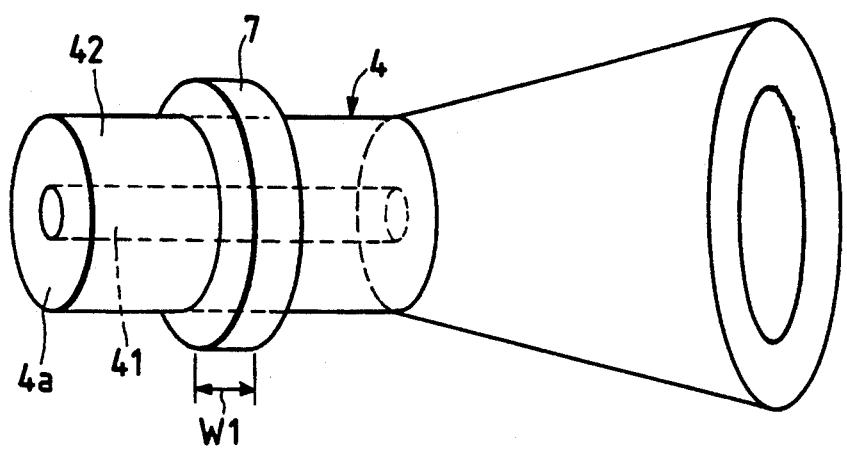
FIG. 5 is a sectional view of a wavelength converter according to a first embodiment of the present invention.

Shown in FIG. 5 wavelength converter 4 is of the optical fiber type. The wavelength converter includes a core 41, a clad 42, and a flange 7 around the circumferential outer surface of clad 42. The core 41 and/or clad 42 are made of nonlinear optical material, such as MNA (2-methyl-4-nitrileanilin). The flange 7 is made of high polymer, transparent material, such as diglycoldiallyylcarbonate, polymethylmetacrylate (PMMA), polystyrene, polycarbonate, and polymicrohexyl methacrylate.

Figure 7:
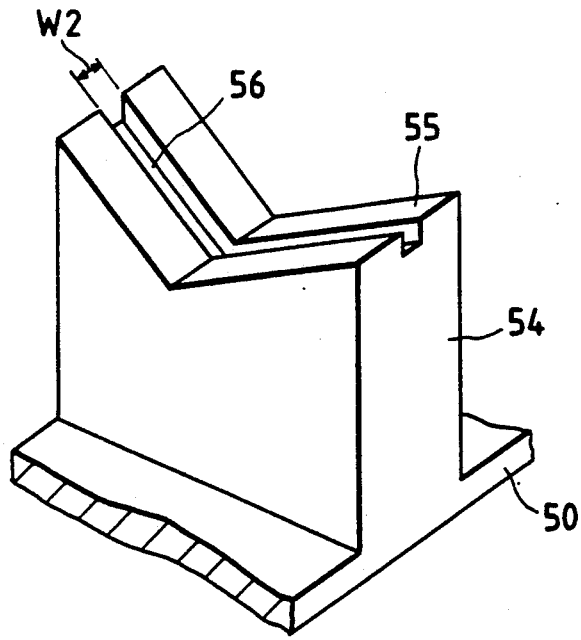
FIG. 7 is a perspective view showing the construction of a holder for holding the wavelength converter of the first embodiment.

FIG. 7 is a perspective view showing the construction of the holder 54 to which wavelength converter 4 is fixed. The upper surface 55 of the holder 54 is V shaped, simplifying the positioning of wavelength converter 4 orthogonal to its optical axis 10. A groove 56 formed in the upper surface has width W2 slightly wider than width W1 of flange 7 for receiving flange 7. Thus wavelength converter 4 mounts on holder 54 with flange 7 received in groove 56.

The holder 54 is located such that when wavelength converter 4 is attached, the incident end face 4a is at or near the focal point of the laser beams emitted from the spherical lens 3. Therefore, wavelength converter 4 can be roughly positioned by merely fitting the flange 7 of the wavelength converter 4 into the groove 56. Thereafter, the wavelength converter 4 is finely positioned by being displaced along the optical axis 10, within the range of clearance between the flange 7 and the groove 56. The accuracy of the positioning being in the order of a submicron. After the positioning operation, the wavelength converter 4 is fixed to the holder 54 by adhesive.

Accordingly, the positioning work of the wavelength converter 4 is remarkably improved, and can be completed in a short time.

Figure 8:
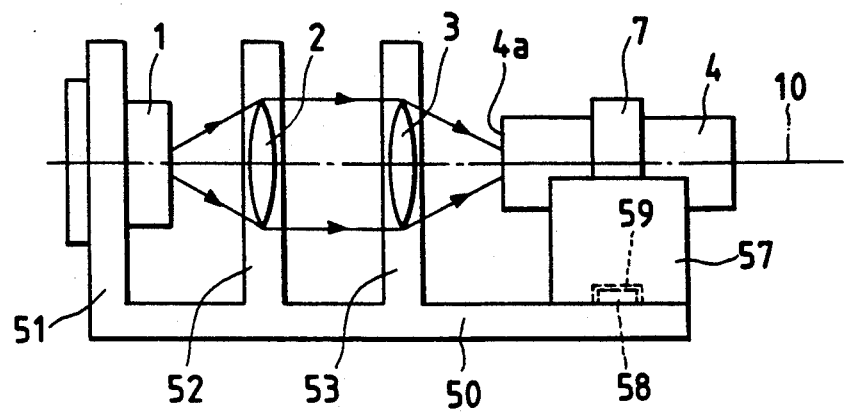
FIG. 8 is a schematic diagram showing another light source device in which an additional structure is used for positioning the wavelength converter.

Fine positioning work of the wavelength converter 4 may also be made using a holder 57, which is separated from the base 50, as shown in FIG. 8. In this case, the wavelength converter 4 is bonded to the holder 57 as described above. A concavity 59 formed in the bottom surface of the holder 57 is applied to a positioning protrusion 58 of the base 50. The holder 57 is properly displaced along the optical axis 10 of the wavelength converter 4 within the range of a clearance between the protrusion 58 and the concavity 59. At the completion of the fine positioning work, the holder 57 is bonded to the base 50.

Figure 9:
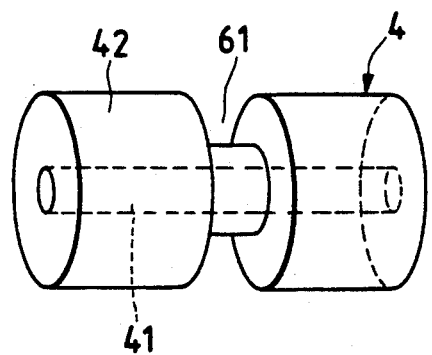
FIGS. 9 and 10 are sectional views showing a wavelength converter according to a second embodiment of the present invention.

FIG. 9 is a perspective view showing a second embodiment of the present invention. In this embodiment, a ring-shaped groove 61, for positioning purposes, is formed on the circumferential surface of the clad 42 by a suitable grinding means, such as a diamond grindstone. A protrusion fitting into the groove 61 is formed on a holder of the wavelength converter (not shown). The groove 61 like flange 7 allows the wavelength converter to be positioned quickly and easily.

Figure 10:
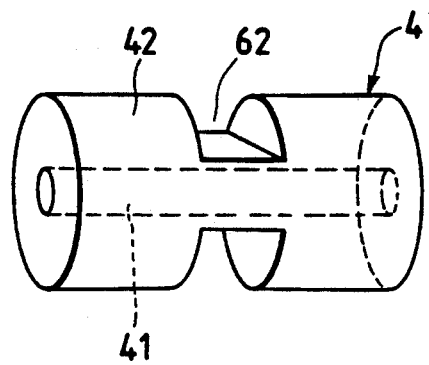

Paired grooves 62, formed by cutting out the wavelength converter 4 as shown in FIG. 10, may be used in place of the ring-shaped groove 61.

Figure 11A:
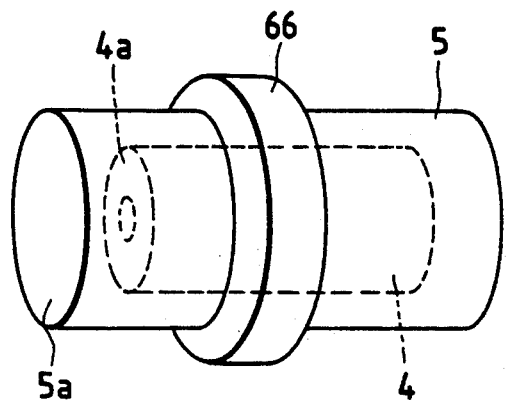
FIGS. 11(a) and 11(b) are a perspective and sectional view of a wavelength converter according to a third embodiment of the present invention.
Figure 11B:
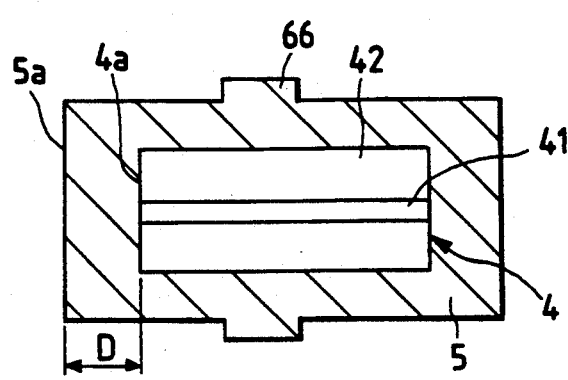

FIG. 11($a$) is a perspective view showing the construction of a third embodiment of the present invention. FIG. 11($b$) is a longitudinal sectional view of the structure of FIG. 11($a$). In this embodiment, the wavelength converter 4 is enclosed by a tubular, transparent layer 5 made of high polymer material, such as diglycoldiallyylcarbonate, polymethylmetacrylate (PMMA), polystyrene, polycarbonate, and polymicrohexyl methacrylate.. A flange 66 as a positioning protrusion is formed around the circumferential surface of the transparent layer 5.

Flange 66 permits positioning similar to that described with respect to flange 7 above. Furthermore, the increased diameter of the structure provides easy handling of the wavelength converter 4, and since the wavelength converter 4 is protected by the high polymer transparent layer 5 scraping is prevented. If distance D, the amount of transparent layer between the laser beam incident end face 5$a$ of the transparent layer 5 and the incident end face 4$a$ of the wavelength converter 4, is sufficiently long; a satisfactory amount of laser light can be gathered into the core 41 through the incident end face 4$a$ irrespective of minor scrapes on the incident end face 5$a$.

Figure 12:
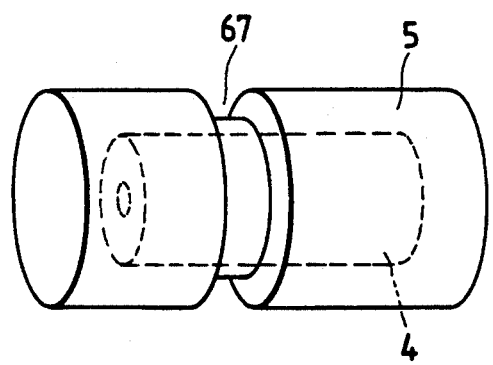
FIG. 12 is a sectional view of a wavelength converter according to a fourth embodiment of the present invention.
Figure 13:
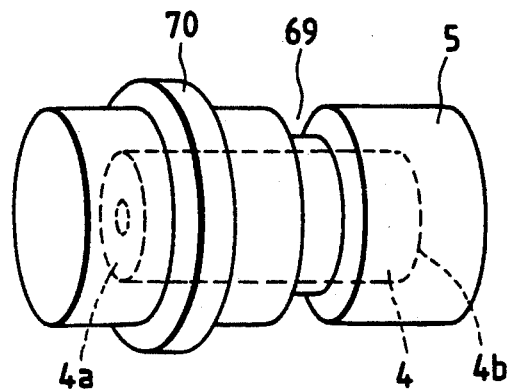
FIG. 13 is a variation of the wavelength converter shown in FIGS. 11 and 12.

A positioning groove 67, shaped like a ring as shown in FIG. 12, may be used in place of the flange 66. Alternatively, as shown in FIG. 13, a positioning groove 69 and a flange 70 may be formed on and in the transparent layer 5. In FIG. 13, the incident end face 4$a$ of the wavelength converter 4 is clearly distinct from the light emitting end face 4$b$. An operator will not confuse the incident side with the emitting side of wavelength converter 4.

The positioning flange and/or groove is not limited to a ring shape, but may take any other suitable shape. Furthermore, one or more flanges and/or grooves may be circumferentially arranged on the outer surface of the transparent layer 5.

Figure 14:
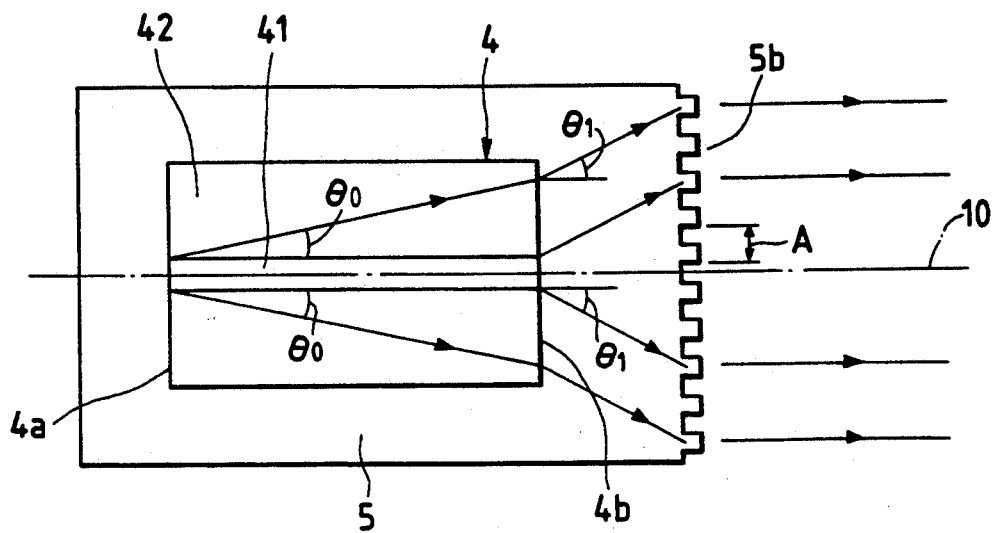
FIG. 14 is a sectional view of a wavelength converter according to a fifth embodiment of the present invention.

A fifth embodiment of a wavelength converter 4 of the optical fiber type according to the present invention is shown in FIG. 14.

On the second harmonic light emitting end face 5$b$ of transparent layer 5 is formed a collimating means in the form of a concentric circular diffraction grating means. The concentric circular diffraction grating means is centered at the optical axis 10 of the wavelength converter 4, and consists of rectangular shaped in cross section gratings linearly arrayed at equal pitches A; which function like a Fresnel lens. A laser light ray emanating from the spherical lens 3 propagates through the transparent layer 5, and enters the core 41 of the wavelength converter 4 through the incident end face 4$a$. Within the wavelength converter 4, Cerenkov radiation of the incident laser light occurs, and the second harmonic light generated propagates within the clad 42 in the direction defined by angle $\theta_0$ with respect to the optical axis 10. The second harmonic light is subjected to diffraction at the light emitting end face 4$b$ due to the difference between the refractive indices of the clad 42 and transparent layer 5. The diffracted second harmonic light propagates through the transparent layer 5 in the direction defined by angle $\theta_1$ with respect to the optical axis 10. The rays of the second harmonic light are then collimated by the concentric circular diffraction grating at the light emitting end face 5$b$.

In order to achieve proper collimation of the second harmonic light rays, the pitch A of the gratings is set according to the following equation:

$$A = m\lambda/\sin \theta_1 \tag{2}$$

where $\lambda$ is the wavelength of the second harmonic light, and M = 1, 2, 3, ... ).

The angles $\theta_0$ and $\theta_1$ satisfy the following equation:

$$n_o \cdot \sin \theta_0 = n_1 \cdot \sin \theta_1 \tag{3}$$

(where $n_o$ is the refractive index of the clad 42 and $n_1$ is the refractive index of the transparent layer 5 for the second harmonic light), and the angle $\theta_0$ is expressed as:

$$\cos \theta_0 = N/n_o \tag{4}$$

(where N is the effective refractive index of the propagating mode of the incident laser light).

Since, collimated rays of second harmonic light are emitted from light emitting end face 5$b$, there is no need for complicated positioning of the wavelength converter 4 or a Fresnel lens. Furthermore, when the collimated light rays are condensed by a known condensing means, a light spot substantially coincident with the diffraction limit is formed.

Figure 15:
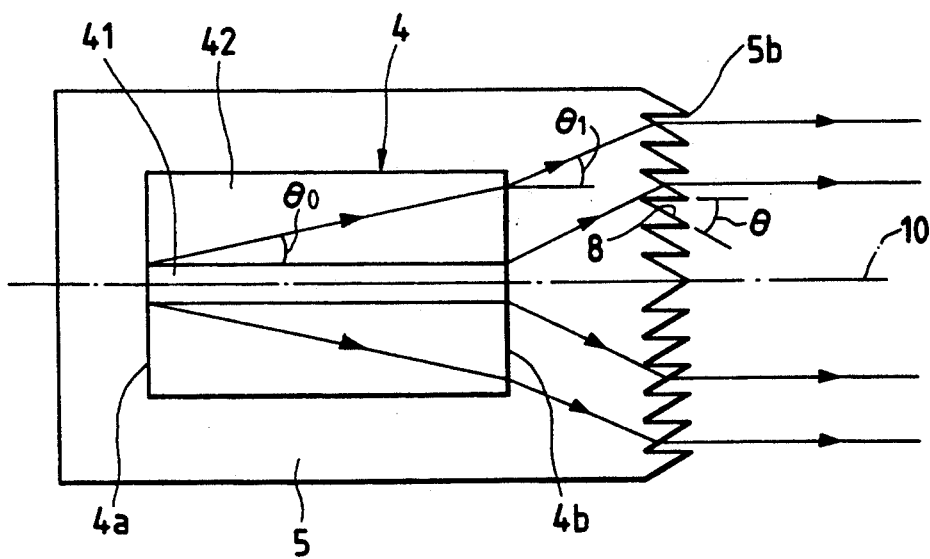
FIG. 15 is a sectional view of a wavelength converter according to a variation of the fifth embodiment.

The shape of the diffraction gratings formed on the light emitting end face 5$b$ of the transparent layer 5 are not limited to being rectangular shaped in cross section as shown in FIG. 14. A concentric circular diffraction granting means having gratings sawtooth shaped in cross section, as shown in FIG. 15, provides an increased diffracting efficiency. In this case, it is preferable that angle $\theta$ of the slanting surface 8 of the concentric circular diffraction grating with respect to the optical axis 10 satisfies the following equation:

$$\tan \theta = (n_1 \cdot \cos \theta_1 - 1)/\sin \theta_1 \tag{5}$$

Figure 16:
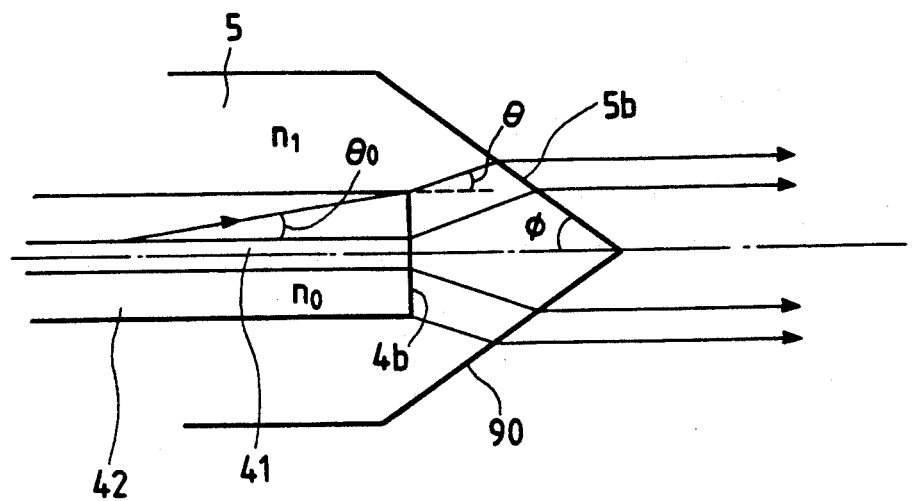
FIG. 16 is a sectional view of a wavelength converter according to a sixth embodiment of the present invention.

The collimating means is not limited to a concentric circular diffraction gratings. A sixth embodiment, shown in FIG. 16, shows a cross section of wavelength converter 4 in which the transparent layer 5 has a circular cone surface 90 at the light emitting end face 4b. The circular cone surface has a vertex angle of 2φ and collimates the second harmonic light emitted at light emitting end face 4b. The axis of rotational symmetry of the circular cone surface 90 is coincident with optical axis 10 of the wavelength converter.

In order to collimate the second harmonic light emitted from the light emitting end face 4b, the vertex angle φ of the circular cone surface 90 is selected to satisfy the following relation based on the Snell laws of refraction:

$$[(n_1^2 - n_o^2 \sin^2\theta_o)^{\frac{1}{2}} - 1]/n_o \sin \theta_o = \tan \phi \quad (6)$$

Since, collimated rays of second harmonic light are emitted from light emitting end face 5b, there is no need for complicated positioning of the wavelength converter or a Fresnel lens. Furthermore, when the collimated light rays are condensed by a known condensing means, a light spot substantially coincident with the diffraction limit is formed.

Figure 17:
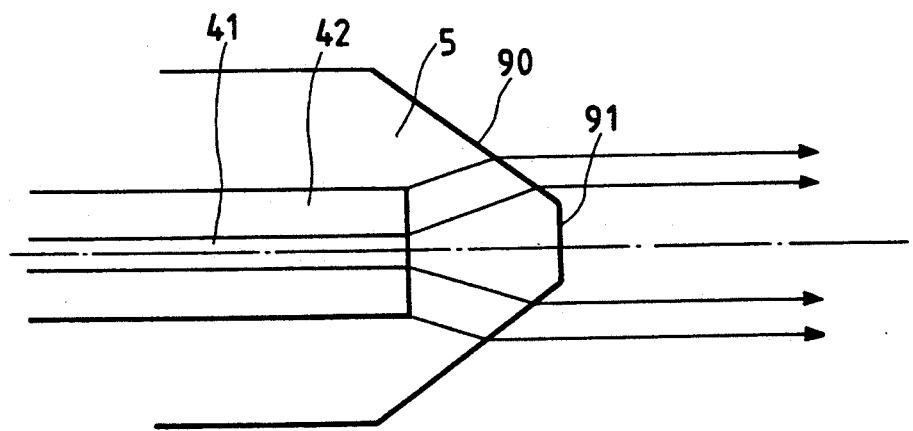
FIG. 17 is a sectional view of a wavelength converter according to variation of the sixth embodiment.
Figure 18A:
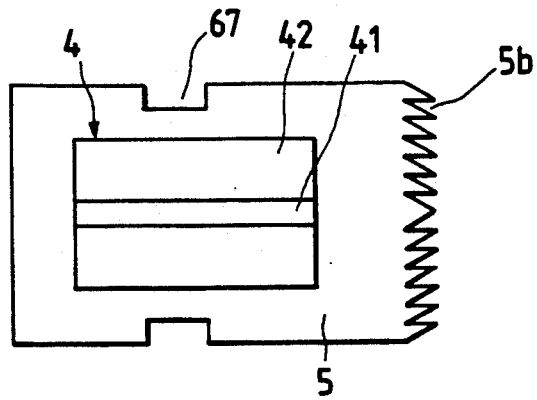
FIGS. 18(a)–18(d) are sectional views of variations of the wavelength converter according to the fifth and sixth embodiments of the present invention.
Figure 18B:
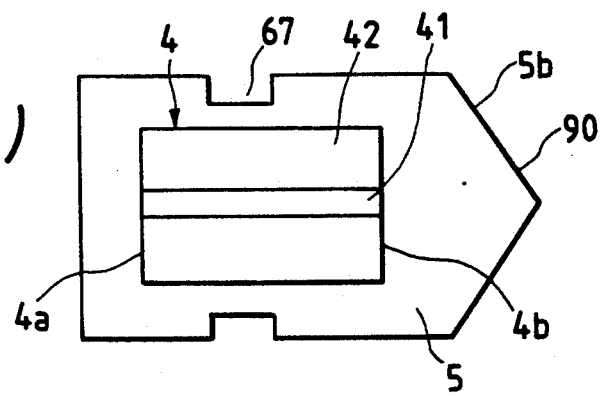
Figure 18C:
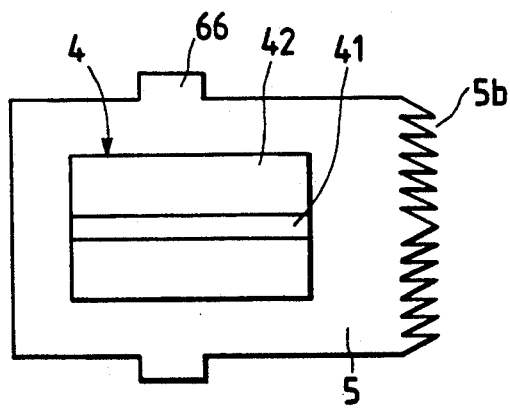
Figure 18D:
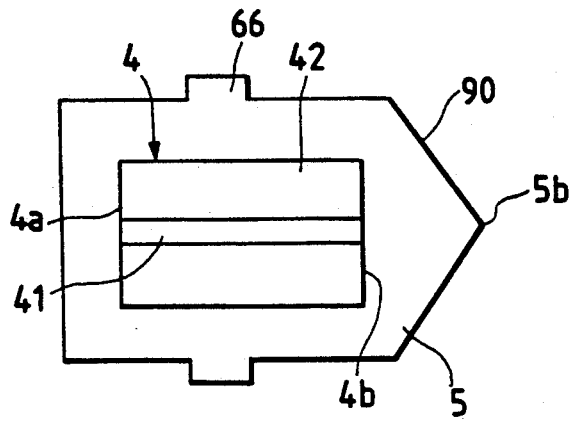
Figure 19A:
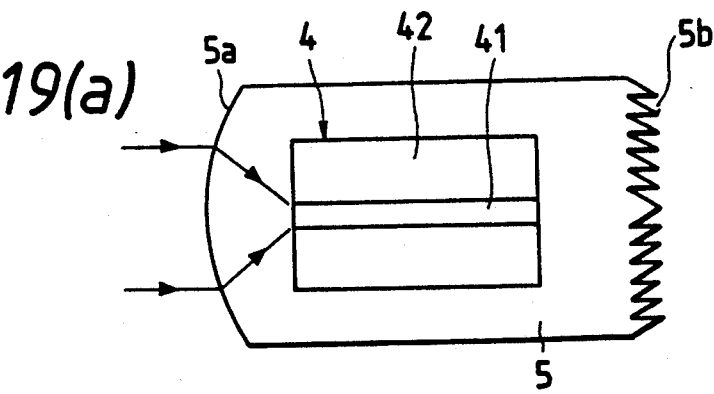
FIGS. 19(a)–19(d) are sectional views of further variations of the wavelength converter according to the fifth and sixth embodiments of the present invention.
Figure 19B:
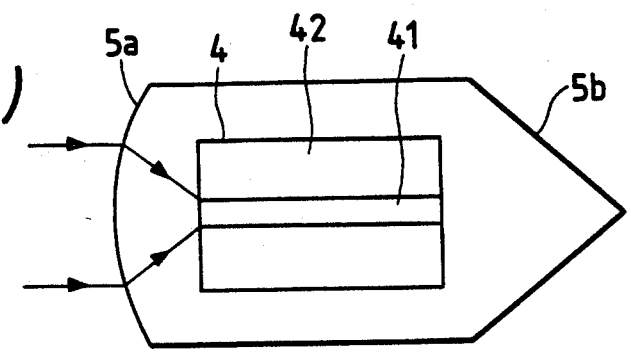
Figure 19C:
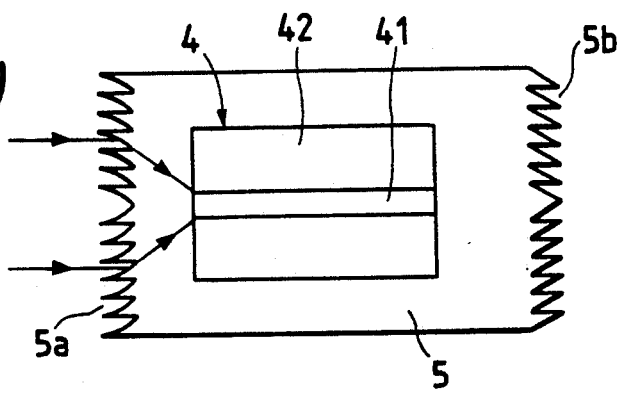
Figure 19D:
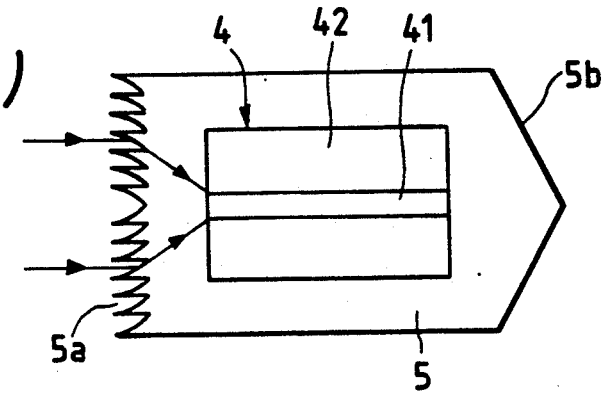

The shape of the circular cone surface 90 is not limited to that shown in FIG. 16. As shown in FIG. 17, a tip of the circular cone surface 90 where no second harmonic light passes may be cut off forming planar end face 91 (i.e. a conical frustrum).

Furthermore, high polymer transparent layer 5 may have various shapes such as shown in FIGS. 18 and 19. A ring-like groove 67 may be formed on the circumferential outer surface of the transparent layer, as shown in FIGS. 18(a) and 18(b), or a flange 66 may be formed around the circumferential outer surface as shown in FIGS. 18(c) and 18(d). Provision of the groove 67 or the flange 66 make it easy to position the wavelength converter 4 when assembling the wavelength converter 4 into a light source device. In FIGS. 19(a) and 19(b), the incident end face 5b is shaped like a spherical (or aspherical) condenser lens. In FIGS. 19(c) and 19(d), a diffraction grating means formed on the incident end face 5b acts like a Fresnel lens. The variations illustrated in FIG. 19 eliminate the use of a spherical condensing lens (such as the spherical condenser lens 3 for condensing the laser light rays of the laser light source 1 shown in FIG. 6) thus simplifying a light source device.

Figure 20A:
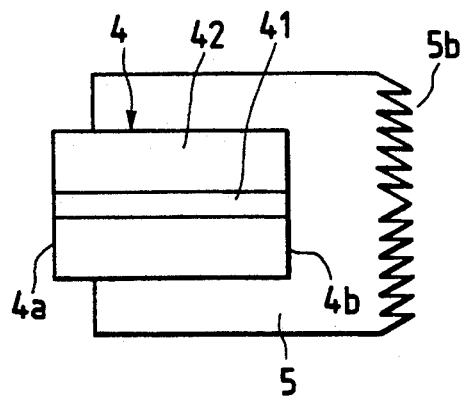
FIGS. 20(a) and 20(b) are sectional views of a wavelength converter according to a further embodiment of the present invention.
Figure 20B:
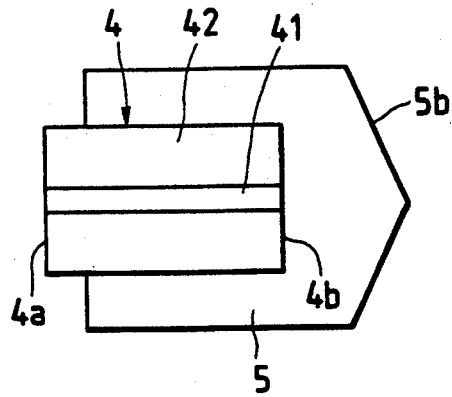

In a further embodiment of the present invention, the incident end face 4a of the wavelength converter 4 is protruded from the transparent layer 5 as shown in FIGS. 20(a) and 20(b). The protruded incident end face 4a allows clear perception by an operator of the wavelength converter 4, making positioning of the wavelength converter 4 within a light source device easier.

Additionally, only the light emitting end face 4b of the wavelength converter 4 may be covered with the transparent layer 5; the circumferential outer surface of the clad 42 not being covered with the transparent layer (not shown). A collimating means is formed solely on the light emitting end face 5b of the transparent layer.

The following is a description of a method of constructing a wavelength converter according to the present invention. In the description to follow, the manufactured wavelength converter is the embodiment shown in FIG. 15, in which the light emitting end face 5b of the transparent layer 5 is formed with a concentric circular diffraction grating means consisting of gratings sawtooth shaped in cross section. It is to be understood that by varying the mold any of the above embodiments may be produced from this method.

The melt of 3, 5-dimethyl-1-(4-nitrophenyl) pyrazole was sucked, by capillary action, into a capillary tube of SF 15 glass having an inner diameter of 0.8 μm and an outer diameter of 1.0 mm. Monocrystalline was grown from an end of the capillary tube by the Bridgman method, thereby forming a wavelength converter 4 of the optical fiber type. The wavelength converter 4 formed was cut to obtain a wavelength converter of 5.0 mm long. One end of the wavelength converter 4 was abraded to form a light emitting end face 4b. A semiconductor laser beam of 0.884 μm in wave length was input to a core of the wavelength converter 4. A laser light of wavelength 0.442 μm was emitted at a radiation angle, the angle of the light emitted with respect to the optical axis of the wavelength converter of 12° from the light emitting end face 4b.

Figure 21:
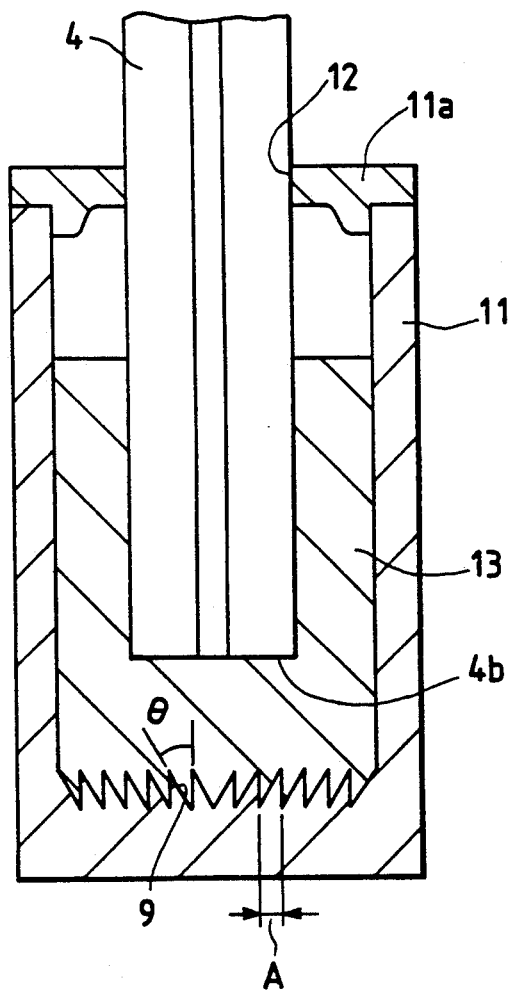
FIGS. 21–23 are longitudinal sectional views for explaining a method of manufacturing a wavelength converter according to an embodiment of the present invention.

The refractive index of the SF 15 glass (clad) was 1.727 for light with a wavelength of 0.442 μm, and the radiation angle within the clad was 6.9°. Then, shown in FIG. 21, the wavelength converter 4 was put into and held in a tubular mold 11 (of which the inner diameter is 2 mm). The bottom of the tubular mold 11 has an impression of a concentric circular diffraction grating means for molding a transparent layer material into a concentric circular diffraction grating with gratings arrayed at a predetermined pitch (i.e. A=3.3 μm), and each grating having a slanting surface at a predetermined angle θ (i.e. θ=76.0°). Next, the optical axis of the wavelength converter 4 was aligned with the axial line of the tubular mold 11, and the abraded light emitting end face 4b was directed toward the bottom of the tubular mold 11. The tubular mold 11 has a cover 11a with a hole 12 at the central part. By merely inserting the wavelength converter 4 into the hole 12, the optical axis of the wavelength converter 4 is automatically aligned with that of the tubular mold 11.

A solution containing MMA (methyl methacrylate) and 1-hydroxycyclohexly phenyl ketone, as optical polymerizaton initiator at the weight ratio of 99.9:0.1, was put into the tubular mold 11 with the wavelength converter 4 fixed thereto. Subsequently, the solution was irradiated with ultraviolet rays to polymerize the MMA, thereby forming PMMA (polymethyl methacrylate) 13. The refractive index of the PMMA was 1.55 for light of wavelength 0.442 μm.

To increase the adhesiveness of the PMMA to the clad glass at the time of polymerization, it is advisable Tat approximately 1% by weight of diethoxydivinylsilane be added to the above solution.

Figure 22:
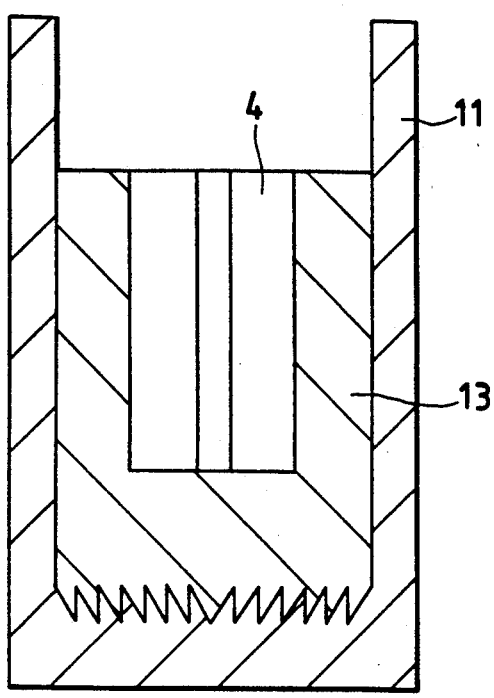
Figure 23:
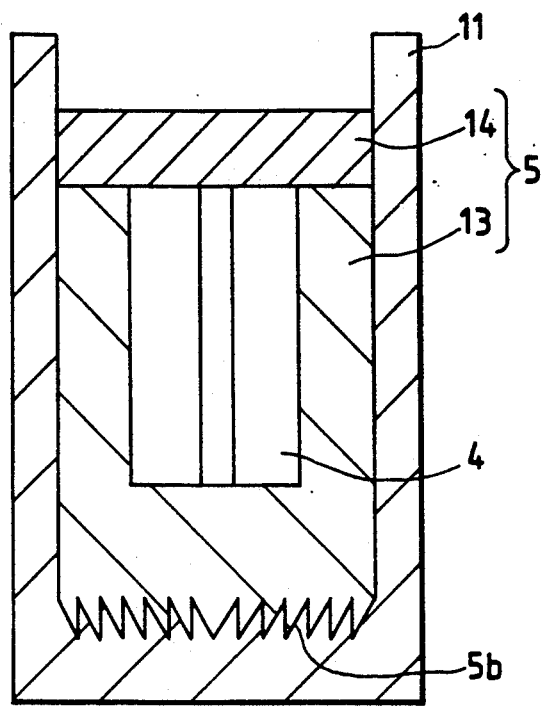

Thereafter, the non-light emitting end of the wavelength converter 4 was cut off, resulting in a wavelength converter of length 1 mm, as shown in FIG. 22. MMA was added again and polymerized to form PMMA 14, which together with the PMMA 13 comprises the high polymer, transparent layer 5, as shown in FIG. 23. Then, the structure thus formed was pulled out of the tubular mold 11, and the PMMA surface to serve as the incident laser light end of wavelength converter was abraded.

A semiconductor laser beam of wavelength 0.884 μm was input to the core of the wavelength converter 4 thus manufactured. The collimated light emitted from light emitting end face 5b had wavelength 0.442 μm.

In the above, the concentric circular diffraction gratings are formed on the light emitting end face 5b of the transparent layer 5 by using the tubular mold 11 having a bottom surface with the shape of the concentric circular diffraction grating. Alternatively, the concentric circular diffraction grating may be formed on a flat light emitting end face by spin coating the light emitting end face with resist, and forming the diffraction gratings by a photolithography or electron beam lithography process.

Figure 24:
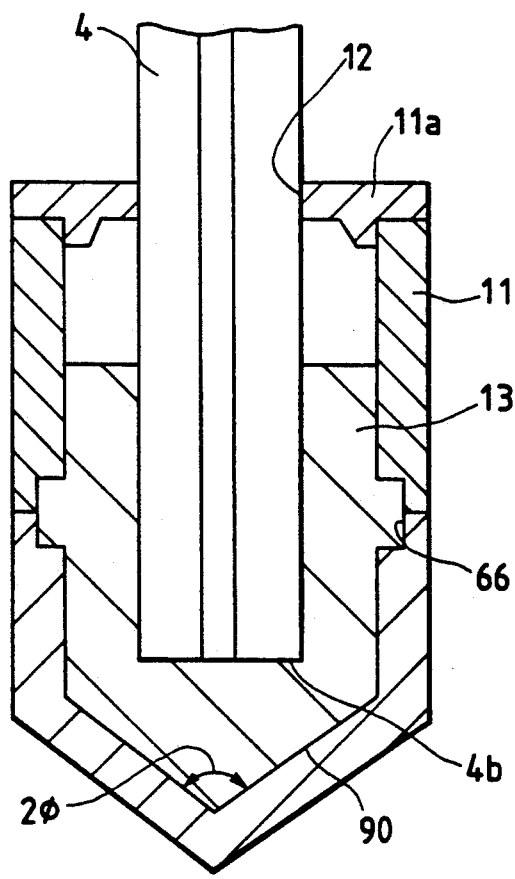
FIGS. 24–26 are longitudinal sectional views for explaining the method of manufacturing a wavelength converter of FIGS. 21–23 according to another embodiment of the present invention.
Figure 25:
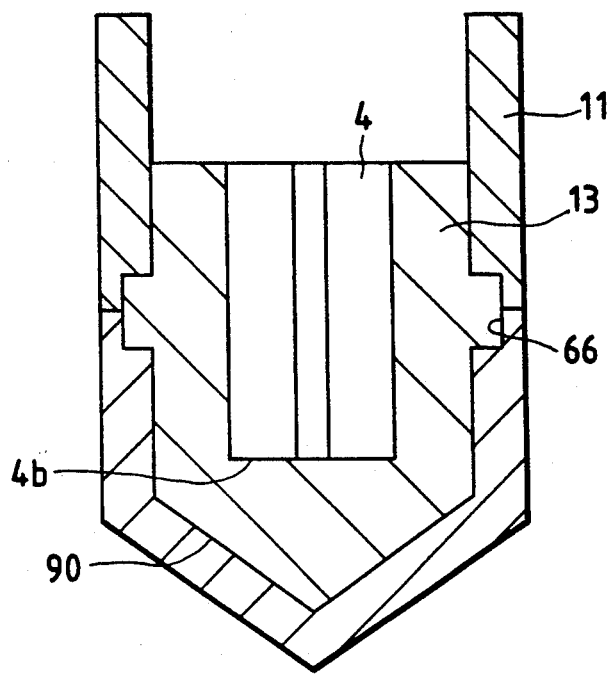
Figure 26:
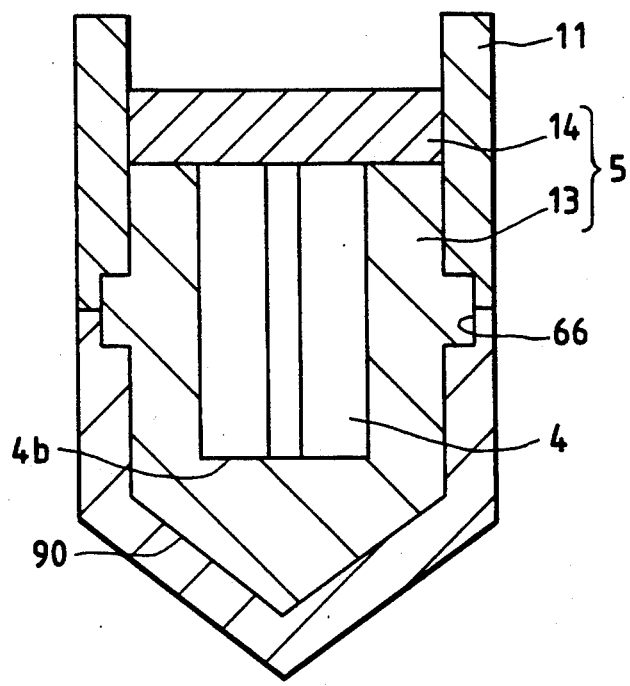

FIGS. 24, 25 and 26 illustrate the molding process described above using a mold for forming the wavelength converter having a circular cone surface 90 with a vertex angle $2\phi$ ($2\phi=133.7°$) formed on the transparent layer 5 at the light emitting end face 4b and flange 66 formed circumferentially around transparent layer 5.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. A wavelength converter of an optical fiber type comprising:
   a core;
   a clad covering said core, at least one of said core and clad being made of a nonlinear optical material; and
   a transparent layer covering said clad, said transparent layer having a groove formed circumferentially therein.

2. A wavelength changing element of an optical fiber type comprising:
   a core;
   a clad covering said core, at least one of said core and clad being made of a nonlinear optical material;
   a transparent layer covering said clad, said transparent layer having a groove formed circumferentially therein; and
   wherein said transparent layer covers a light emitting end face of said optical fiber; and said transparent layer has a collimating means formed at said light emitting end face for collimating rays of light propagating in said optical fiber.

3. A wavelength converter according to claim 2, wherein said collimating means is a concentric circular diffraction grating means.

4. A wavelength converter according to claim 2, wherein said collimating means is a circular cone surface.

5. A wavelength converter of an optical fiber type comprising:
   a core;
   a clad covering said core, at least one of said core and clad being made of a nonlinear optical material; and
   a transparent layer covering said clad; said transparent layer having a flange of transparent layer material formed circumferentially thereon.

6. A wavelength changing element of an optical fiber type comprising:
   a core;
   a clad covering said core, at least one of said core and clad being made of a nonlinear optical material;
   a transparent layer covering said clad; said transparent layer having a flange of transparent layer material formed circumferentially thereon; and
   wherein said transparent layer covers a light emitting end face of said optical fiber; and said transparent layer has a collimating means formed at said light emitting end face for collimating rays of light propagating in said optical fiber.

7. A wavelength converter according to claim 6, wherein said collimating means is a concentric circular diffraction grating means.

8. A wavelength converter according to claim 6, wherein said collimating means is a circular cone surface.

9. A wavelength converter of an optical fiber type comprising:
   a core;
   a clad covering said core, at least one of said core and clad being made of a nonlinear optical material; and
   a transparent layer covering said clad, said transparent layer having at least one flange of transparent layer material formed circumferentially thereon and at least one groove formed circumferentially therein.

10. A wavelength converter of an optical fiber type comprising:
    a core;
    a clad covering said core, at least one of said core and clad being made of a nonlinear optical material;
    a transparent layer covering at least a light emitting end face of said optical fiber and having a collimating means formed at said light emitting end face for collimating light.

11. A wavelength converter according to claim 10, wherein said transparent layer covers at least said clad and said light emitting end face.

12. A wavelength changing element of an optical fiber type comprising:
    a core;
    a clad covering said core, at least one of said core and clad being made of a nonlinear optical material;
    a transparent layer covering at least a light emitting end face of said optical fiber and having a collimating means formed at said light emitting end face for collimating light;
    wherein said transparent layer covers at least said clad and said light emitting end face; and
    wherein said transparent layer has a groove formed circumferentially therein.

13. A wavelength changing element of an optical fiber type comprising:
    a core;
    a clad covering said core, at least one of said core and clad being made of a nonlinear optical material;
    a transparent layer covering at least a light emitting end face of said optical fiber and having a collimating means formed at said light emitting end face for collimating light;
    wherein said transparent layer covers at least said clad and said light emitting end face; and
    wherein said transparent layer has a flange formed circumferentially thereon.

14. A wavelength changing element of an optical fiber type comprising:
    a core;
    a clad covering said core, at least one of said core and clad being made of a non linear optical material;
    a transparent layer covering at least a light emitting end face of said optical fiber and having a collimating means formed at said light emitting end face for collimating light; and
    wherein said collimating means is a concentric circular diffraction gratings means.

15. A wavelength converter according to claim 14, wherein diffraction gratings forming said concentric circular diffraction grating means are rectangular shaped in cross section.

16. A wavelength converter according to claim 14, wherein diffraction gratings forming said concentric circular diffraction grating means are saw tooth shaped in cross section.

17. A wavelength converter according to claim 14, wherein in said concentric circular diffraction grating means is aligned with an optical axis of said optical fiber.

18. A wavelength changing element of an optical fiber type comprising:
a core;
a clad covering said core, at least one of said core and clad being made of a nonlinear optical material;
a transparent layer covering at least a light emitting end face of said optical fiber and having a collimating means formed at said light emitting end face for collimating light; and
wherein said collimating means is a circular cone surface.

19. A wavelength converter according to claim 18, wherein in said circular cone surface is aligned with an optical axis of said optical fiber.

20. A wavelength changing element of an optical fiber type comprising:
a core;
a clad covering said core, at least one of said core and clad being made of a nonlinear optical material;
a transparent layer covering at least a light emitting end face of said optical fiber and having a collimating means formed at said light emitting end face for collimating light; and
wherein said collimating means is a conical frustrum.

21. A wavelength converter of an optical fiber type, said optical fiber having a light incident end face and a light emitting end face, said wavelength converter comprising:
a core;
a clad covering said core, at least one of said core and clad being made of a nonlinear optical material; and
a transparent layer covering said optical fiber, said transparent layer having a collimating means formed at said light emitting end face for collimating light, and having a condensing means formed at said light incident end face for condensing light on said core.

22. A wavelength converter according to claim 21, wherein said condensing means is a concentric circular diffraction grating means.

23. A wavelength converter according to claim 21, wherein said condensing means is a spherical surface.

24. A wavelength converter of an optical fiber type comprising:
a core;
a clad covering said core, at least one of said core and clad being made of a nonlinear optical material;
a transparent layer covering a portion of said clad and a light emitting end face of said optical fiber, thereby leaving exposed an incident end face of said optical fiber, said transparent layer having a collimating means formed at said light emitting end face for collimating light.

25. A method of manufacturing a wavelength converter of an optical fiber type having a core and a clad covering said core, at least one of said core and clad being made of nonlinear optical material, said optical fiber having an abraded light emitting end face, said method comprising the steps of:
inserting said abraded light emitting end face of said optical fiber into a tubular mold, said tubular mold having at its bottom an impression of a collimating means;
adding to said tubular mold transparent layer material in sufficient quantity to cover at least said abraded light emitting end of said optical fiber;
irradiating said transparent layer material to form a transparent layer which has a collimating means formed thereon by said impression of said collimating means at said tubular mold bottom.

26. A method as in claim 25, wherein in the step of inserting, said abraded light emitting end face of said optical fiber is inserted through a hole in a cover of said tubular mold, thereby aligning the optical axis of said optical fiber in said tubular mold.

27. A method as in claim 25, wherein said impression of said collimating means at said tubular mold bottom is a concentric circular diffraction grating.

28. A method as in claim 25, wherein said impression of said collimating means at said tubular mold bottom is a circular cone surface.

29. A method as in claim 25, further comprising the steps of:
adding to said tubular mold a sufficient quantity of transparent layer material to cover a non-light emitting end face of said optical fiber;
irradiating said transparent layer material to from a transparent layer over said non-light emitting end face; and
abrading said transparent layer covering said non-light emitting end face to form an incident light end face of said wavelength converter.

* * * * *